US008814204B2

(12) United States Patent
Fukawatase

(10) Patent No.: US 8,814,204 B2
(45) Date of Patent: Aug. 26, 2014

(54) AUTOMOBILE SEAT IN WHICH SIDE AIRBAG DEVICE IS INSTALLED

(75) Inventor: Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/879,645

(22) PCT Filed: Jan. 27, 2011

(86) PCT No.: PCT/JP2011/051675
§ 371 (c)(1),
(2), (4) Date: Apr. 16, 2013

(87) PCT Pub. No.: WO2012/101809
PCT Pub. Date: Aug. 2, 2012

(65) Prior Publication Data
US 2013/0292929 A1 Nov. 7, 2013

(51) Int. Cl.
*B60R 21/207* (2006.01)
*B60R 21/261* (2011.01)

(52) U.S. Cl.
CPC ............. *B60R 21/207* (2013.01); *B60R 21/261* (2013.01)
USPC ...................................... 280/730.2

(58) Field of Classification Search
CPC ................................................... B60R 21/207
USPC .......................................................... 280/730.2
See application file for complete search history.

(56) References Cited

U.S. PATENT DOCUMENTS

| 5,826,938 | A  | * | 10/1998 | Yanase et al. | 297/216.13 |
| 5,906,390 | A  | * | 5/1999  | Phillion et al. | 280/728.3 |
| 6,062,593 | A  |   | 5/2000  | Satani et al. | |
| 6,213,498 | B1 | * | 4/2001  | Ghalambor et al. | 280/730.2 |
| 6,224,092 | B1 | * | 5/2001  | Sakamoto et al. | 280/730.2 |
| 6,513,828 | B2 | * | 2/2003  | Aulbach | 280/728.3 |
| 7,669,888 | B2 | * | 3/2010  | Sato et al. | 280/730.2 |
| 7,926,838 | B2 | * | 4/2011  | Honda et al. | 280/729 |
| 7,931,294 | B2 | * | 4/2011  | Okada et al. | 280/730.2 |
| 7,992,894 | B2 | * | 8/2011  | Lim et al. | 280/730.2 |
| 8,033,570 | B2 | * | 10/2011 | Sato et al. | 280/730.2 |
| 8,136,834 | B2 | * | 3/2012  | Fredriksson et al. | 280/730.2 |
| 8,177,256 | B2 | * | 5/2012  | Smith et al. | 280/730.2 |
| 8,181,989 | B2 | * | 5/2012  | Okuhara | 280/730.2 |
| 8,286,995 | B2 | * | 10/2012 | Shibayama et al. | 280/730.2 |

(Continued)

FOREIGN PATENT DOCUMENTS

| JP | A-10-24795 | 1/1998 |
| JP | A-10-230811 | 9/1998 |
| JP | A-2007-145192 | 6/2007 |
| JP | A-2007-145193 | 6/2007 |
| JP | A-2007-145194 | 6/2007 |

(Continued)

*Primary Examiner* — Nicole Verley
(74) *Attorney, Agent, or Firm* — Oliff PLC

(57) ABSTRACT

In an automobile seat, a portion of a side airbag is disposed further toward a vehicle front side than an inflator. Therefore, the side airbag can be expanded toward a vehicle front side of an outer-side side support portion, i.e., toward a side of a waist portion of a passenger. Moreover, because the inflator is disposed at a vehicle front side of an outer-side side frame, the inflator can be set close to a center of a waist of a passenger for which restraining by the side airbag is desired. Further, because the side airbag and the inflator are not structures that are disposed so as to interpose the outer-side side frame 20B therebetween, ease of assembly into a seatback is good.

15 Claims, 6 Drawing Sheets

(56) References Cited

U.S. PATENT DOCUMENTS

| | | | |
|---|---|---|---|
| 2007/0246919 A1* | 10/2007 | Kai | 280/730.1 |
| 2009/0020988 A1* | 1/2009 | Sato et al. | 280/730.2 |
| 2012/0025499 A1* | 2/2012 | Shibayama et al. | 280/730.2 |
| 2012/0223550 A1* | 9/2012 | Mazanek et al. | 297/216.1 |

FOREIGN PATENT DOCUMENTS

| | | |
|---|---|---|
| JP | A-2009-23490 | 2/2009 |
| JP | A-2009-143260 | 7/2009 |
| JP | A-2010-70003 | 4/2010 |
| JP | A-2010-70178 | 4/2010 |

* cited by examiner

AUTOMOBILE SEAT IN WHICH SIDE AIRBAG DEVICE IS INSTALLED

TECHNICAL FIELD

The present invention relates to an automobile seat in which a side airbag device is installed.

BACKGROUND ART

In the side airbag device shown in following Patent Document 1, it is disposed such that a folded-up portion of a side airbag is positioned at the vehicle transverse direction outer side, and an inflator is positioned at the vehicle transverse direction inner side, so as to interpose the side frame (side frame) of a seatback therebetween. Further, the inflator is disposed at the vehicle rear side of the side frame, and at least a portion of the folded-up portion of the side airbag is disposed at the vehicle front side of the inflator. Due thereto, both an improvement in the design of the seatback and an improvement in the ease of installation and the expansion performance of the side airbag device are achieved.

Patent Document 1: Japanese Patent Application Laid-Open No. 2007-145192

DISCLOSURE OF INVENTION

Technical Problem

However, in a side airbag device as described above, the inflator is disposed at the vehicle rear side of the side frame, and is disposed at the vehicle transverse direction inner side of that side frame. Namely, the inflator is at a position that is far removed from the center of the waist of the passenger for which restraining by the side airbag is desired, and therefore, there is room for improvement with regard to the point of aiming for an improvement in the initial restraining performance. Further, because the side airbag and the inflator are disposed so as to interpose the side frame therebetween as described above, there is room for improvement also with regard to the point of the ease of assembly into the seatback.

In consideration of the above-described circumstances, an object of the present invention is to provide an automobile seat in which a side airbag device is installed that can improve the initial restraining performance of a side airbag and can make the ease of assembly into a seatback good.

Solution to Problem

An automobile seat in which a side airbag device is installed relating to a first aspect of the invention comprises: a seatback at which an outer-side side frame, that structures a portion of a seatback frame, is disposed within an outer-side side support portion that is positioned at a vehicle transverse direction outer side; an inflator that is mounted at the outer-side side frame, and is disposed at a vehicle front side of the outer-side side frame; and a side airbag that accommodates the inflator at an inner side thereof, and that is disposed within the outer-side side support portion in a folded-up state, and a folded-up one portion of the side airbag is disposed further toward a vehicle front side than the inflator that is disposed at the vehicle front side of the outer-side side frame, and a folded-up remaining portion of the side airbag is disposed further toward a vehicle rear side than the inflator, and the side airbag inflates and expands toward a vehicle front side of the outer-side side support portion due to pressure of gas jetted-out from the inflator.

In the automobile seat in which a side airbag device is installed that is recited in the first aspect of the invention, a portion of the side airbag, that is disposed within the outer-side side support portion in a folded-up state, is disposed further toward the vehicle front side than the inflator. Therefore, the side airbag can be expanded toward the vehicle front side of the outer-side side support portion, i.e., toward the side of the waist portion of the passenger. Moreover, because the inflator is disposed at the vehicle front side of the outer-side side frame, the inflator can be set near to the center of the waist of the passenger for which restraining by the side airbag is desired. Due thereto, the side airbag can be expanded rapidly toward the side of the waist portion of the passenger, and therefore, the initial restraining performance of the side airbag can be improved effectively. Moreover, in this invention, the side airbag and the inflator are not structures that are disposed so as to interpose the outer-side side frame therebetween, and therefore, the ease of assembly into the seatback can be made to be good.

In an automobile seat in which a side airbag device is installed relating to a second aspect of the invention, in the automobile seat in which a side airbag device is installed that is recited in the first aspect of the invention, at the seatback, an inner-side side frame, that structures a portion of the seatback frame, is disposed within an inner-side side support portion that is positioned at a vehicle transverse direction inner side, the outer-side side frame and the inner-side side frame are formed in open cross-sectional shapes whose seat transverse direction inner sides are open and whose vehicle rear sides project out, further than vehicle front sides, toward seat transverse direction outer sides, and the remaining portion of the side airbag that is folded-up is disposed along a vehicle transverse direction outer side surface of the outer-side side frame.

In the automobile seat in which a side airbag device is installed that is recited in the second aspect of the invention, the outer-side side frame and the inner-side side frame that structure the seatback frame are formed in open cross-sectional shapes whose seat transverse direction inner sides are open and whose vehicle rear sides project outward, further than the vehicle front sides, toward the seat transverse direction outer sides. Due thereto, the rigidity of the seatback frame can be improved effectively. Moreover, in the present invention, the inflator is disposed at the vehicle front side of the outer-side side frame, and the remaining portion of the folded-up side airbag is disposed along the vehicle transverse direction outer side surface of the outer-side side frame. Therefore, even though there is a structure in which the vehicle rear side of the outer-side side frame projects-out toward the seat transverse direction outer side (the vehicle transverse direction outer side), it is easy to ensure the installation space of the inflator and the side airbag.

In an automobile seat in which a side airbag device is installed relating to a third aspect of the invention, in the automobile seat in which a side airbag device is installed that is recited in the first or second aspect of the invention. a tubular retainer that is formed in a tube shape is mounted at the outer-side side frame, and the inflator is accommodated within the tubular retainer, and a surface at a vehicle rear side of the tubular retainer is provided as a reaction force receiving surface that receives a reaction force from the outer-side side frame at a time of inflation and expansion of the side airbag.

In the automobile seat in which a side airbag device is installed that is recited in the third aspect of the invention, the inflator is accommodated within the tubular retainer, and this tubular retainer is mounted at the outer-side side frame. Due thereto, the main body portion (the so-called airbag module) of the side airbag device that includes the inflator can be easily assembled to the outer-side side frame. Moreover, the surface at the vehicle rear side of the tubular retainer is provided as a reaction force receiving surface that receives a reaction force from the outer-side side frame at the time of inflation and expansion of the side airbag. Therefore, the side airbag can be more reliably expanded toward the side of the waist portion of the passenger by using this reaction force receiving surface.

In an automobile seat in which a side airbag device is installed relating to a fourth aspect of the invention, in the automobile seat in which a side airbag device is installed that is recited in the third aspect of the invention, the tubular retainer is formed to be rectangular in cross-section.

In the automobile seat in which a side airbag device is installed that is recited in the fourth aspect of the invention, because the tubular retainer is formed to be rectangular in cross-section, a wide surface area of the reaction force receiving surface (the surface at the vehicle rear side) of the tubular retainer can be ensured. Due thereto, the surface pressure that is applied to the reaction force receiving surface of the tubular retainer is reduced, and a concentration of stress can be suppressed. Therefore, the reaction force from the side airbag can be supported well.

In an automobile seat in which a side airbag device is installed relating to a fifth aspect of the invention, in the automobile seat in which a side airbag device is installed that is recited in the third or fourth aspect of the invention, gas through-holes are formed in a vehicle front side and a vehicle transverse direction outer side at a lower portion of the tubular retainer, and gas jet-out ports that are provided at a lower portion of the inflator are disposed at a lower portion side of the tubular retainer.

In the automobile seat in which a side airbag device is installed that is recited in the fifth aspect of the invention. at the time of a side collision of the vehicle or the like, when the inflator operates, gas, that is jetted-out from the gas jet-out ports provided at the lower portion of the inflator, is supplied into the side airbag via the gas through-holes that are formed in the vehicle front side and the vehicle transverse direction outer side at the lower portion of the tubular retainer. As a result, the side airbag inflates rapidly toward the oblique front side (the side door side) of the outer-side side support portion, and therefore, the reaction force from the side door can be imparted to the side airbag at an early stage. Due thereto, at the time when the waist portion of the passenger hits the side airbag, the waist portion of the passenger can be restrained at an early stage, and therefore, the initial restraining performance of the side airbag can be improved more effectively.

Advantageous Effects of Invention

As described above, in the automobile seat in which a side airbag device is installed relating to the present invention, the initial restraining performance of a side airbag can be improved, and the ease of assembly into a seatback can be made to be good.

BEST MODE FOR CARRYING OUT THE INVENTION

Figure 1:
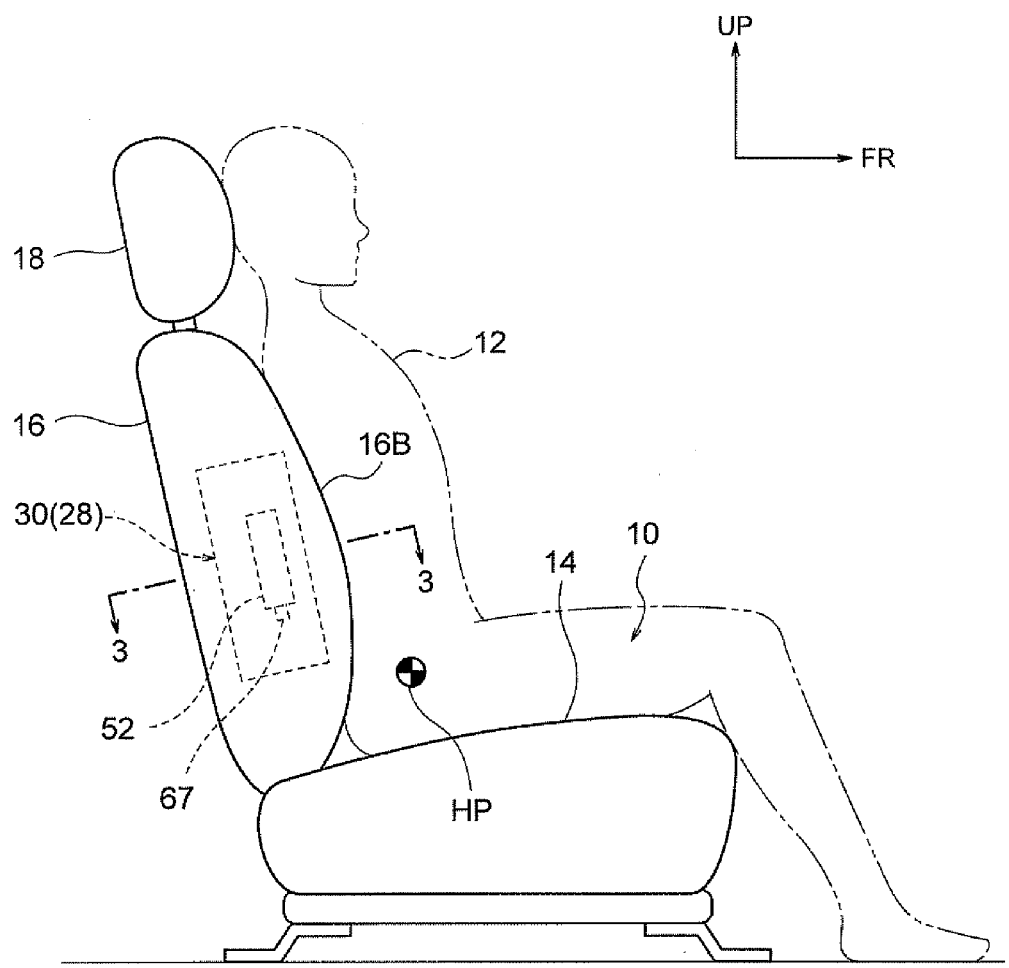
FIG. 1 is a side view showing the structure of an automobile seat in which a side airbag device is installed, relating to an embodiment of the present invention.

A vehicle seat 10 in which a side airbag device is installed, that relates to an embodiment of the present invention (hereinafter simply called "vehicle seat 10"), is described hereinafter by using FIG. 1 through FIG. 6. Note that arrow FR in the drawings indicates the vehicle front side, arrow UP indicates the vehicle upper side, and arrow OUT indicates the vehicle transverse direction outer side. Further, in the present embodiment, the forward direction, upward direction and transverse direction of the vehicle seat 10 coincide with the forward direction, upward direction and transverse direction of the vehicle.

The vehicle seat 10 relating to the present embodiment is a front seat, and, as shown in FIG. 1, is structured to include a seat cushion 14 on which a passenger 12 sits, a seatback 16 that is tiltably supported at the rear end portion of this seat cushion 14 and that is used as a backrest of the passenger 12 (the seated person), and a headrest 18 that is supported at the upper end portion of this seatback 16 and supports the head portion of the passenger 12.

Figure 2:
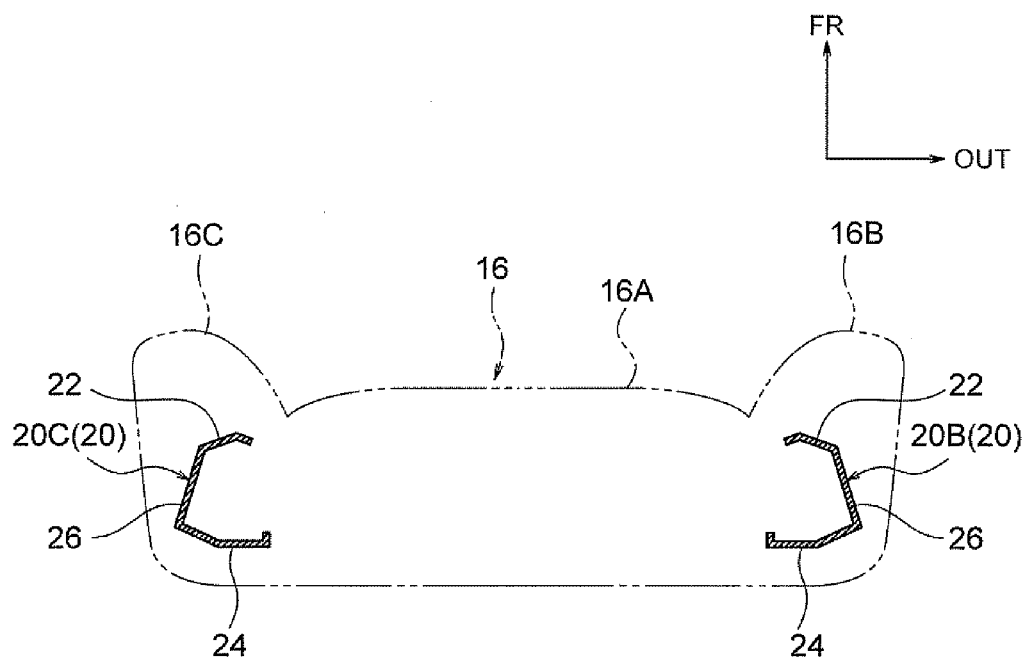
FIG. 2 is a lateral sectional view showing the structure of a seatback frame of the automobile seat in which the side airbag device is installed, relating to the embodiment of the present invention.

As shown in FIG. 2, the seatback 16 has a seatback main body portion 16A that is disposed at the seat transverse direction central portion and directly supports the back of the passenger 12, an outer-side side support portion 16B that is provided integrally with the vehicle transverse direction outer side end portion of this seatback main body portion 16A, and an inner-side side support portion 16C that is provided integrally with the vehicle transverse direction inner side end portion of the seatback main body portion 16A. Note that the outer-side side support portion 16B and the inner-side side support portion 16C are both shaped to protrude toward the vehicle front side, and are structures that support the upper body of the passenger 12 from the sides.

An outer-side side frame 20B that structures a seatback frame 20 is disposed within the outer-side side support portion 16B along the vertical direction of the seatback 16. Similarly, an inner-side side frame 20C that structures the seatback frame 20 is disposed within the inner-side side support portion 16C along the vertical direction of the seatback 16. Note that the seatback frame 20 is formed in a substantial upside-down U-shape whose lower side is open, as seen from the front side of the seatback 16, and the both sides thereof are structured by the outer-side side frame 20B and the inner-side side frame 20C.

The outer-side side frame 20B and the inner-side side frame 20C are formed, by press-molding of sheet metal materials, in open cross-sectional shapes whose seat transverse direction inner sides are open, and have front walls 22 and rear walls 24 that face in the longitudinal direction of the seatback 16, and side walls 26 that connect the seat transverse direction outer side end portions of the front walls 22 and the rear walls 24.

The front wall 22 is inclined with respect to the seat transverse direction so as to project-out toward the vehicle front side while heading toward the seat transverse direction inner side. Further, the proximal end side of the rear wall 24 is inclined with respect to the seat transverse direction so as to project-out toward the vehicle rear side while heading toward the seat transverse direction inner side, and the distal end side is disposed along the seat transverse direction. Further, the side wall 26 is inclined with respect to the seat longitudinal direction so as to project-out toward the vehicle transverse direction outer side while heading toward the vehicle rear side. Namely, as seen from the vertical direction of the seatback 16, the outer-side side frame 20B and the inner-side side frame 20C are formed in open cross-sectional shapes whose vehicle rear sides project-out, further than the vehicle front sides, toward the seat transverse direction outer sides. Note that it suffices for at least the vertical direction intermediate portions of the outer-side side frame 20B and the inner-side side frame 20C to be formed in cross-sectional shapes such as described above.

On the other hand, as shown in FIG. 1, a side airbag module 30 that structures a side airbag device 28 is provided internally in the vertical direction intermediate portion of the outer-side side support portion 16B. Hereinafter, the peripheral structures of the side airbag module 30 are described.

Figure 3:
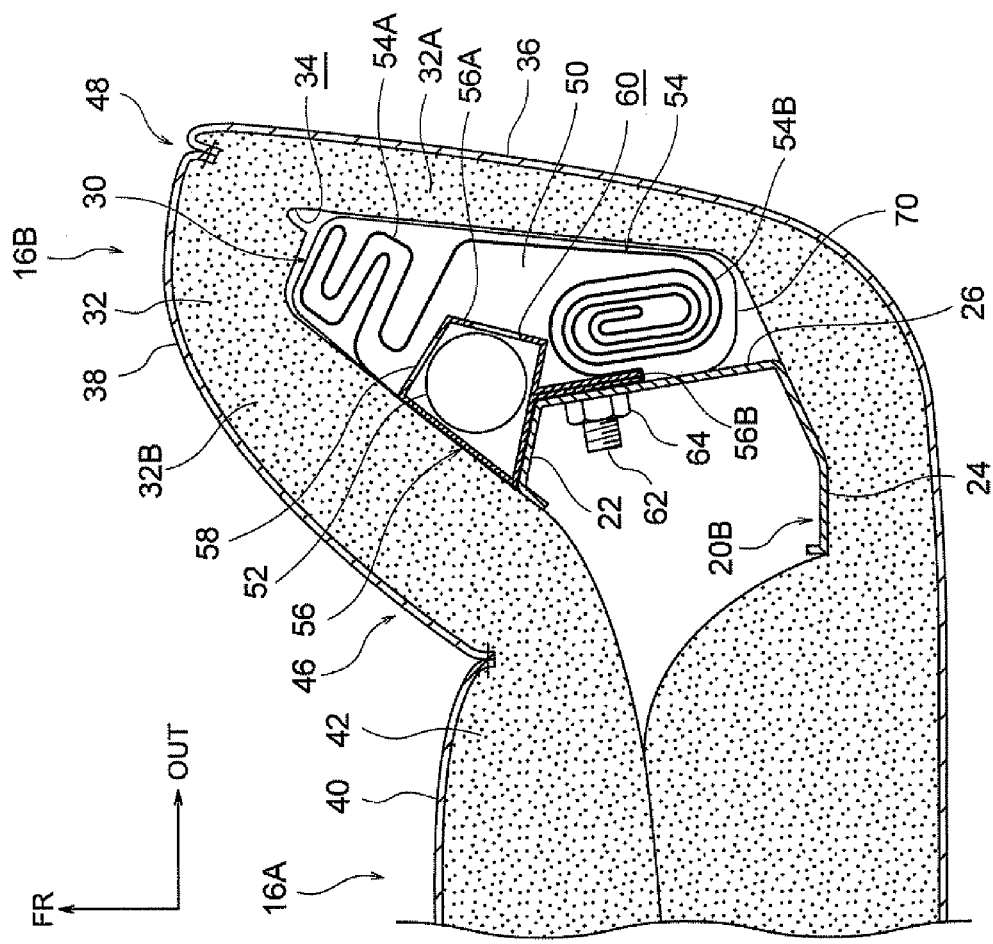
FIG. 3 is an enlarged lateral sectional view showing a cut cross-section along line 3-3 of FIG. 1.

As shown in FIG. 3, a seatback pad side portion 32 that is formed from urethane foam is disposed at the periphery of the side airbag module 30. This seatback pad side portion 32 has a pad outer side portion 32A that structures the seat transverse direction outer side portion of the outer-side side support portion 16B, and a pad inner side portion 32B that extends-out toward the seatback main body portion 16A side from the front portion of this pad outer side portion 32A and structures the front portion and the seat transverse direction inner side portion of the outer-side side support portion 16B. A concave groove 34, that is cut-in at the vehicle front side, is formed at the inner angle side at which the pad outer side portion 32A and the pad inner side portion 32B intersect. At times of inflation and expansion of a side airbag 54 that is described later, this concave groove 34 becomes the rupture starting point at the time when the seatback pad side portion 32 is divided into the pad outer side portion 32A and the pad inner side portion 32B.

Moreover, a side skin 36 is disposed at the vehicle transverse direction outer side of the above-described pad outer side portion 32A. Further, a front skin 38 is disposed at the vehicle front side of the pad inner side portion 32B. The inner end portion of the front skin 38 is sewn-together with the outer end portion of a center skin 40 that is provided at the seatback main body portion 16A. This center skin 40 covers the front surface of a seatback pad main body 42 that is formed of urethane foam and is provided at the seatback main body portion 16A. Further, the side skin 36 covers the side surface of the seatback pad side portion 32 and the rear surface of the seatback pad main body 42. The front end portion of the side skin 36 is sewn-together with the outer end portion of the front skin 38. These side skin 36, front skins 38 and center skin 40 structure a seat skin 46 that covers the surface of the seatback 16. Note that, in the present embodiment, the sewn-together portion of the outer end portion of the front skin 38 and the front end portion of the side skin 36 is a planned rupture portion 48 of the seat skin 46.

On the other hand, the above-described side airbag module 30 is disposed within a space 50 (hollow portion) that is formed between the outer-side side frame 20B and the seatback pad side portion 32. This side airbag module 30 has an inflator 52 serving as a gas generating means, the side airbag 54 that inflates and expands toward the vehicle front side due to gas jetted-out from the inflator 52, and a tubular retainer 56 that fixes the inflator 52 to the outer-side side frame 20B and functions as a diffuser that directs, in predetermined directions, the gas jetted-out from the inflator 52.

Figure 4:
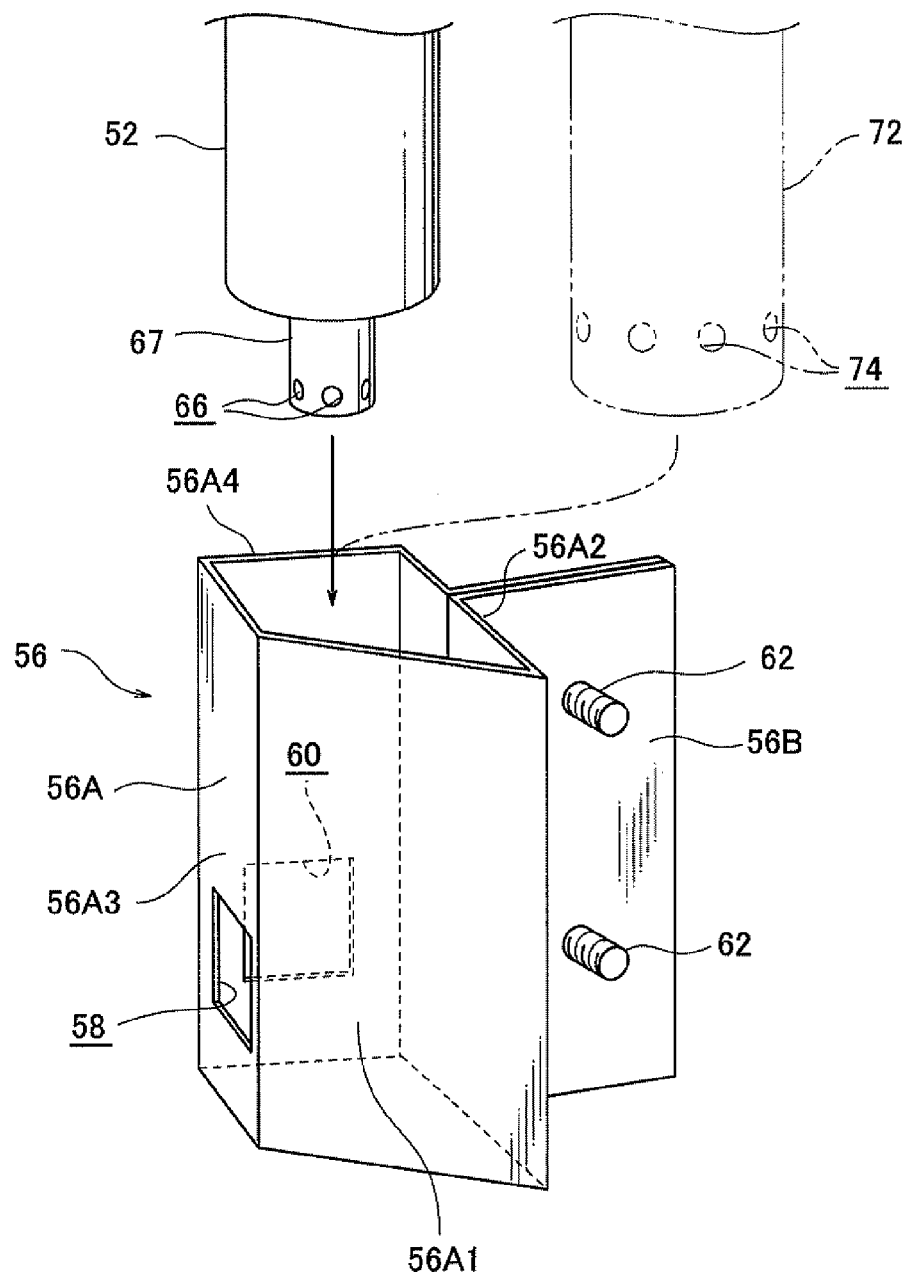
FIG. 4 is a perspective view showing the structures of a tubular retainer and an inflator shown in FIG. 3.
Figure 5:
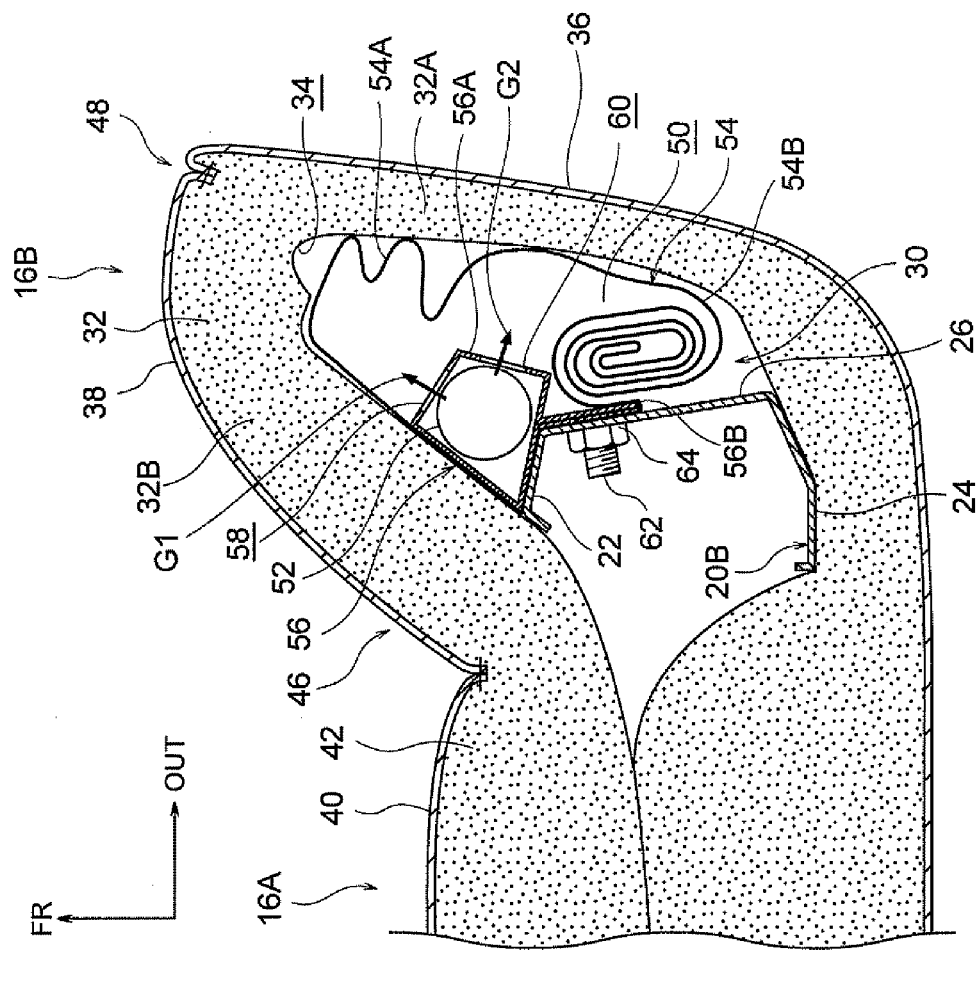
FIG. 5 is a lateral sectional view corresponding to FIG. 3, and is a drawing showing a state in which a portion of a side airbag is inflated by the pressure of gas jetted-out from the inflator.

As shown in FIG. 4, the tubular retainer 56 is formed by a sheet metal material being subjected to bending-processing, and has a retainer main body 56A that is formed in the shape of an elongated tube having a rectangular cross-section. The retainer main body 56A is disposed at the vehicle front side of the outer-side side frame 20B, in a state in which the longitudinal direction runs along the vertical direction of the seatback 16. At the retainer main body 56A, an inner wall 56A1, that is the side wall at the vehicle transverse direction inner side, faces the pad inner side portion 32B, and the rear surface (the surface at the vehicle rear side) of a rear wall 56A2, that is the side wall at the vehicle rear side, abuts the front surface (the surface at the vehicle front side) of the front wall 22 at the outer-side side frame 20B. The rear surface of this rear wall 56A2 is made to be a reaction force receiving surface that receives reaction force from the front wall 22 of the outer-side side frame 20B at the time of inflation and expansion of the side airbag 54. Further, at this retainer main body 56A, gas through-holes 58, 60 that are respectively rectangular are formed in the lower portion of a front wall 56A3 that is the side wall at the vehicle front side, and in the lower portion of an outer wall 56A4 that is the side wall at the vehicle outer side (i.e., the vehicle front side and the vehicle transverse direction outer side at the lower portion of the retainer main body 56A). Note that the open surface area of the gas through-hole 58 at the vehicle front side is preferably set to be larger than the open surface area of the gas through-hole 60 at the vehicle transverse direction outer side. Due thereto, the side airbag 54 can be expanded at an early stage at the side of the waist portion of the passenger. Further, a bottom wall is not provided at this retainer main body 56A, and the lower end is open. Due thereto, it is designed such that the side airbag 54 is expanded at an early stage at the side of the waist portion of the passenger, due to gas that has been jetted-out from the inflator 52 being supplied toward the lower side of the side airbag 54.

Moreover, a plate-shaped fastening portion 56B extends-out toward the vehicle rear side from the vehicle transverse direction central portion of the rear wall 56A2 of the retainer main body 56A. This fastening portion 56B abuts the outer side surface (the surface at the vehicle transverse direction outer side) of the side wall 26 at the outer-side side frame 20B. A pair of upper and lower stud bolts 62 are fixed to this fastening portion 56B. These stud bolts 62 pass-through through-holes that are formed in the side wall 26. Nuts 64 are screwed-together with these stud bolts 62, and, due thereto, the tubular retainer 56 is fastened and fixed to the outer-side side frame 20B.

The inflator 52 that serves as a gas generating means is accommodated at the inner side of the retainer main body 56A. This inflator 52 is mounted to the outer-side side frame 20B via the tubular retainer 56, and, together with the retainer main body 56A of the tubular retainer 56, is disposed at the vehicle front side of the outer-side side frame 20B. This inflator 52 is formed in a substantially cylindrical tube shape, and is disposed (disposed so as to be placed vertically) in a state in which the axial direction (longitudinal direction) runs along the vertical direction of the seatback 16, and is fixed by caulking or the like to the tubular retainer 56 at an unillustrated region. A gas jet-out portion 67, in which plural gas jet-out ports 66 are formed, is provided at the lower end portion of the inflator 52. The plural gas jet-out ports 66 are disposed at the lower portion side of the retainer main body 56, and, in the vertical direction of the seatback 16, are disposed at the same height as the gas through-holes 56, 60 of the retainer main body 56A.

The above-described inflator 52 and tubular retainer 56 are accommodated at the interior of the side airbag 54. The side airbag 54 is sewn in the form of a bag and formed of a sheet-shaped material such as cloth or a resin sheet or the like, and is disposed within the space 50 in a folded-up state. In detail, one portion 54A of the side airbag 54 is bellows-folded and is disposed further toward the vehicle front side than the inflator 52 and the retainer main body 56A, and a remaining portion 54B of the side airbag 54 is roll-folded and is disposed along the vehicle transverse direction outer side surface of the side wall 26 of the outer-side side frame 20B. Namely, in this embodiment, the accommodating space of the side airbag is set at both the vehicle front side and the vehicle rear side of the inflator 52. Note that the ways of folding-up the one portion 54A and the remaining portion 54B of the side airbag 54 are not limited to the above-described ways of folding, and can be changed appropriately.

Further, at this side airbag 54, a region at the vehicle transverse direction inner side of the intermediate portion between the one portion 54B and the remaining portion 54B is nipped between the tubular retainer 56 and the outer-side side frame 20B. Unillustrated through-holes, through which the stud bolts 62 pass, are formed in this nipped region, and the side airbag 54 is fixed, together with the tubular retainer 56, to the outer-side side frame 20B. Moreover, this side airbag 54 is held in the folded-up state by being wrapped by a wrapping material 70 that ruptures easily. Due thereto, the side airbag module 30 is made into a sub-assembly substantially in the shape of a box.

Here, in the present embodiment, the above-described inflator 52 is electrically connected to an unillustrated airbag ECU. The airbag ECU is electrically connected to an unillustrated airbag sensor, and, on the basis of a sensing signal from the airbag sensor, the airbag ECU judges whether or not to operate the side airbag device. When the airbag ECU judges that the airbag is to be operated, a predetermined current is supplied to the inflator 52. Due thereto, there is a structure in which a gas generating agent, that is filled within the inflator 52, burns, and a large amount of gas is jetted-out to the interior of the side airbag 54.

Note that, in the present embodiment, the side airbag 54 is made to be a large airbag (a so-called two-chamber-type airbag) that can restrain the chest portion and the waist portion of the seated passenger 12, and the inflator 52 is made to be a so-called hybrid-type inflator. However, the present invention is not limited to this, and, when the side airbag is a small airbag (an airbag that restrains only the chest portion of the passenger, or the like), a pylon-type inflator 72 (refer to the two-dot chain line in FIG. 4) is applied. In this case also, gas jet-out ports 74 of the inflator 72 are disposed at the lower portion side of the retainer main body 56A.

Operation and effects of the present embodiment are described next. In the vehicle seat 10 of the above-described structure, when the vehicle enters into a side collision or overturns, on the basis of a sensing signal from the unillustrated airbag sensor, the airbag ECU operates the inflator 52, and gas is jetted-out from the gas jet-out ports 66 of the inflator 52. Gas jetted-out from the gas jet-out ports 66 is jetted-out toward the vehicle front side via the gas through-hole 58 as shown by arrow G1 in FIG. 5, and the portion 54A of the side airbag 54, that is disposed at the vehicle front side of the inflator 52, inflates at an early stage. Further, gas jetted-out from the gas jet-out ports 66 is jetted-out toward the vehicle transverse direction outer side via the gas through-hole 60 as shown by arrow G2 in FIG. 5, and the remaining portion 54B of the side airbag 54, that is disposed at the vehicle transverse direction outer side of the outer-side side frame 20B, inflates (note that, for convenience of explanation, illustration of the wrapping material 70 is omitted in FIG. 5).

When the side airbag 54 inflates, the inflation pressure of the side airbag 54 acts on the seatback pad side portion 32, and the seatback pad side portion 32 is divided into the pad outer side portion 32A and the pad inner side portion 32B, with the concave groove 34 being the starting point. Further, the inflation pressure of the side airbag 54 acts on the planned rupture portion 48 of the seat skin 46 via the seatback pad side portion 32. Due thereto, the seat skin 46 ruptures (breaks open) at the planned rupture portion 48, and the pad outer side portion 32A and the side skin 36 unfold toward the vehicle transverse direction outer side, and the pad inner side portion 32B and the front skin 38 unfold toward the vehicle transverse direction inner side. As a result, an opening is formed in the front end portion of the outer-side side support portion 16B, and the side airbag 54 inflates toward the vehicle front side of the outer-side side support portion 16B via this opening. The side airbag 54, that has inflated toward the vehicle front side of the outer-side side support portion 16B, inflates and expands between an unillustrated side door and the chest portion and waist portion of the passenger 12. Due thereto, the chest portion and the waist portion of the passenger 12 are restrained by the side airbag 54, and the passenger 12 is protected from the impact of a side collision or the like.

Here, in the present embodiment, the one portion 54A of the side airbag 54, that is disposed in a folded-up state within the outer-side side support portion 16B, is disposed further toward the vehicle front side than the inflator 52. Therefore, as described above, the side airbag 54 expands toward the vehicle front side of the outer-side side support portion 16B, i.e., toward the side of the chest portion and the waist portion of the passenger 12. Moreover, because the inflator 52 is disposed at the vehicle front side of the outer-side side frame 20B, the distance between the inflator 52 and the center of the waist (the region denoted by reference numeral HP in FIG. 1) of the passenger 12, for which restraining by the side airbag 54 is desired, is set to be small. Due thereto, the pressure loss of the gas jetted-out from the inflator 52 becomes small, and therefore, the side airbag 54 expands rapidly between the side door and the chest portion and waist portion of the passenger 12. Due thereto, the initial restraining performance of the side airbag 54 effectively improves.

Moreover, in the present embodiment, there is not a structure in which the side airbag 54 and the inflator 52 are disposed so as to interpose the outer-side side frame 20B therebetween, as in the side airbag device described in the Background Art section. Therefore, the ease of assembling the side airbag module 30 into the seatback 16 can be made to be good.

Further, in the present embodiment, the outer-side side frame 20B and the inner-side side frame 20C that structure the seatback frame 20 are formed in open cross-sectional shapes whose seat transverse direction inner sides are open and whose vehicle rear sides project-out, further than the vehicle front sides, toward the seat transverse direction outer sides. Due thereto, the rigidity of the seatback frame 20 effectively improves. Accordingly, at the time of a rear collision of the vehicle, the seatback frame 20 deforming toward the vehicle rear side due to the load from the passenger, and the headrest 18 retreating, can be suppressed. Due thereto, the head portion of the passenger 12 can be supported rapidly by the headrest 18, and therefore, whiplash injuries of the neck portion of the passenger 12 can be effectively suppressed or prevented.

Moreover, in the present embodiment, the inflator 52 is disposed at the vehicle front side of the outer-side side frame 20B, and the remaining portion 54B of the folded-up side airbag 54 is disposed along the vehicle transverse direction outer side surface of the outer-side side frame 20B. Therefore, even though there is a structure in which the vehicle rear side of the outer-side side frame 20B projects-out toward the seat transverse direction outer side (the vehicle transverse direction outer side), it is easy to ensure the installation space of the inflator 52 and the side airbag 54.

Figure 6:
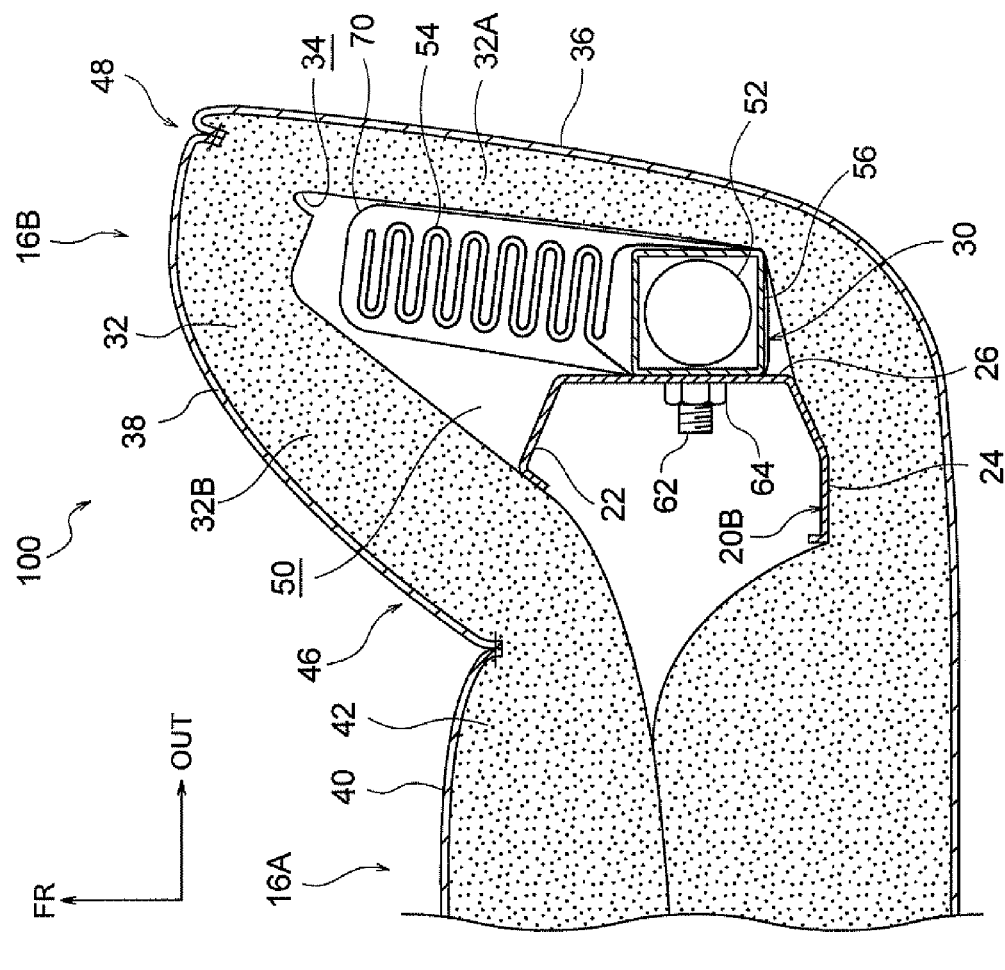
FIG. 6 is a lateral sectional view corresponding to FIG. 3 and showing a comparative example of the embodiment of the present invention.

Namely, in the case of a structure in which the vehicle rear side of the outer-side side frame 20B does not project-out toward the seat transverse direction outer side (the vehicle transverse direction outer side) such as comparative example 100 shown in FIG. 6, the installation space of the inflator 52 can be ensured at the vehicle transverse direction outer side and vehicle rear side of the outer-side side frame 20B. However, in this case, when the installation space of the inflator 52 is set at the vehicle front side of the outer-side side frame 20B, the installation space of the side airbag 54 decreases, and therefore, the installation space of the inflator 52 must be set at the vehicle rear side of the outer-side side frame 20B. In particular, when the side airbag 54 is a large airbag of two chambers or the like, installation of the side airbag 54 is difficult (note that, in FIG. 6, structures that are basically similar to those of the present embodiment are denoted by the same reference numerals). In contrast, in the present embodiment, owing to the structure such as described above, the installation space of the inflator 52 and the side airbag 54 can easily be ensured while the rigidity of the seatback frame 20 is effectively improved.

Further, in the present embodiment, the airbag module 30 is mounted to the outer-side side frame 20B by the inflator 52 being accommodated in the tubular retainer 56 and that tubular retainer 56 being fixed to the outer-side side frame 20B. Due thereto, the airbag module 30 that includes the inflator 52 can be easily assembled to the outer-side side frame 20B. Moreover, the rear surface of the rear wall 56A2 (see FIG. 4) of the retainer main body 56A is made to be a reaction force receiving surface that receives reaction force from the front wall 22 of the outer-side side frame 20B at the time of inflation and expansion of the side airbag 54. Therefore, the side airbag 54 can be more reliably expanded toward the side of the waist portion of the passenger by using this reaction force receiving surface.

Moreover, in the present embodiment, the retainer main body 56A of the tubular retainer 56 is formed to be rectangular in cross-section, and a wide surface area of the reaction force receiving surface of the retainer main body 56A is ensured. Due thereto, the surface pressure that is applied to the reaction force receiving surface of the retainer main body 56A is reduced, and a concentration of stress can be suppressed. Therefore, the reaction force from the side airbag 54 can be supported well.

Further, in the present embodiment, as described above, gas that is jetted-out from the gas jet-out ports 66 of the inflator 52 is jetted-out to the vehicle front side and the vehicle transverse direction outer side via the gas through-holes 58, 60 of the retainer main body 56A. Due thereto, the side airbag 54 inflates rapidly toward the oblique front side (the side door side) of the outer-side side support portion 16B, and therefore, the reaction force from the side door can be imparted to the side airbag 54 at an early stage. Due thereto, at the time when the chest portion and the waist portion of the passenger 12 hit the side airbag 54, the chest portion and the waist portion of the passenger 12 can be restrained at an early stage, and therefore, the initial restraining performance of the side airbag 54 can be improved more effectively.

Note that the above-described embodiment is structured such that the rectangular gas through-holes 58, 60 are formed in the vehicle front side and the vehicle transverse direction outer side at the lower portion of the retainer main body 56A of the tubular retainer 56. However, the inventions relating to the first through fourth aspects of the invention are not limited to this, and the shapes and placement of the gas through-holes can be changed appropriately.

Further, the above-described embodiment is structured such that the gas jet-out ports 66 of the inflator 52 are disposed at the lower portion side of the retainer main body 56A. However, the inventions relating to the first through fourth aspects of the invention are not limited to this, and the placement of the gas jet-out ports of the inflator can be changed appropriately.

Moreover, although the above-described embodiment is structured such that the tubular retainer 56 is formed in a rectangular shape in cross-section, the inventions relating to the first through third aspects of the invention are not limited to this, and the cross-sectional shape of the tubular retainer can be changed appropriately. For example, the tubular retainer may be structured so as to be formed in a circular shape in cross-section.

Further, although the above-described embodiment is structured such that the inflator 52 is accommodated within the tubular retainer 56, the inventions relating to the first and second aspects of the invention are not limited to this, and may be structured such that the tubular retainer is omitted.

Further, the above-described embodiment is structured such that the surface at the vehicle rear side of the retainer main body 56A of the tubular retainer 56 (the rear surface of the rear wall 56A2) is made to be a reaction force receiving surface that receives reaction force from the outer-side side frame 20B at the time of inflation and expansion of the side airbag 54. However, the inventions relating to the first and second aspects of the invention are not limited to this, and may be structured such that the retainer main body 56A is disposed so as to be apart from the outer-side side frame 20B.

Further, the above-described embodiment is structured such that the outer-side side frame 20B and the inner-side side frame 20C are formed in open cross-sectional shapes whose seat transverse direction inner sides are open and whose vehicle rear sides project-out, further than the vehicle front sides, toward the seat transverse direction outer sides. However, the invention relating to the first aspect of the invention is not limited to this, and the shapes of the outer-side side frame 20B and the inner-side side frame 20C can be changed appropriately.

Further, the above-described embodiment is structured such that the one portion 54A of the side airbag 54 that is folded-up is disposed further toward the vehicle front side than the inflator 52, and the remaining portion 54B is disposed along the vehicle transverse direction outer side surface of the outer-side side frame 20B. However, the invention relating to the first aspect of the invention is not limited to this, and it suffices for at least one portion of the side airbag 54 to be disposed further toward the vehicle front side than the inflator 52.

Further, in the above-described embodiment, a case is described in which the present invention is applied to a front seat of a vehicle, but the present invention is not limited to this and can be applied also to a rear seat of a vehicle.

In addition, the present invention can be implemented by being charged in various ways within a scope that does not deviate from the gist thereof. Further, it goes without saying that the scope of the right of the present invention is not limited to the above-described respective embodiments.

The invention claimed is:

1. An automobile seat in which a side airbag device is installed, comprising:
    a seatback at which an outer-side side frame, that structures a portion of a seatback frame, is disposed within an outer-side side support portion that is positioned at a vehicle transverse direction outer side;
    an inflator that is mounted to the outer-side side frame, and is disposed at a vehicle front side of the outer-side side frame; and
    a side airbag that accommodates the inflator at an inner side thereof, and that is disposed within the outer-side side support portion in a folded-up state, wherein a folded-up one portion of the side airbag is disposed further toward a vehicle front side than the inflator that is disposed at the vehicle front side of the outer-side side frame, a folded-up remaining portion of the side airbag is disposed further toward a vehicle rear side than the inflator, and both the folded-up one portion and the folded-up remaining portion inflate and expand toward a vehicle front side of the outer-side side support portion due to pressure of gas jetted-out from the inflator.

2. The automobile seat in which a side airbag device is installed of claim 1, wherein
    at the seatback, an inner-side side frame, that structures a portion of the seatback frame is disposed within an inner-side side support portion that is positioned at a vehicle transverse direction inner side,
    the outer-side side frame and the inner-side side frame are formed in open cross-sectional shapes whose seat transverse direction inner sides are open and whose vehicle rear sides project-out, further than vehicle front sides, toward seat transverse direction outer sides, and
    the remaining portion of the side airbag that is folded-up is disposed along a vehicle transverse direction outer side surface of the outer-side side frame.

3. The automobile seat in which a side airbag device is installed of claim 2, wherein a tubular retainer that is formed in a tube shape is mounted at the outer-side side frame, and the inflator is accommodated within the tubular retainer, and a surface at a vehicle rear side of the tubular retainer is provided as a reaction force receiving surface that receives a reaction force from the outer-side side frame at a time of inflation and expansion of the side airbag.

4. The automobile seat in which a side airbag device is installed of claim 3, wherein the tubular retainer is formed to be rectangular in cross-section.

5. The automobile seat in which a side airbag device is installed of claim 4, wherein gas through-holes are formed in a vehicle front side and a vehicle transverse direction outer side at a lower portion of the tubular retainer, and gas jet-out ports that are provided at a lower portion of the inflator are disposed at a lower portion side of the tubular retainer.

6. The automobile seat in which a side airbag device is installed of claim 3, wherein gas through-holes are formed in a vehicle front side and a vehicle transverse direction outer side at a lower portion of the tubular retainer, and gas jet-out ports that are provided at a lower portion of the inflator are disposed at a lower portion side of the tubular retainer.

7. The automobile seat in which a side airbag device is installed of claim 1, wherein a tubular retainer that is formed in a tube shape is mounted at the outer-side side frame, and the inflator is accommodated within the tubular retainer, and a surface at a vehicle rear side of the tubular retainer is provided as a reaction force receiving surface that receives a reaction force from the outer-side side frame at a time of inflation and expansion of the side airbag.

8. The automobile seat in which a side airbag device is installed of claim 7, wherein the tubular retainer is formed to be rectangular in cross-section.

9. The automobile seat in which a side airbag device is installed of claim 7, wherein gas through-holes are formed in a vehicle front side and a vehicle transverse direction outer side at a lower portion of the tubular retainer, and gas jet-out ports that are provided at a lower portion of the inflator are disposed at a lower portion side of the tubular retainer.

10. The automobile seat in which a side airbag device is installed of claim 8, wherein gas through-holes are formed in a vehicle front side and a vehicle transverse direction outer side at a lower portion of the tubular retainer, and gas jet-out ports that are provided at a lower portion of the inflator are disposed at a lower portion side of the tubular retainer.

11. An automobile seat in which a side airbag device is installed, comprising:
    a seatback at which an outer-side side frame, that structures a portion of a seatback frame, is disposed within an outer-side side support portion that is positioned at a vehicle transverse direction outer side;
    an inflator that is mounted to the outer-side side frame, and is disposed at a vehicle front side of the outer-side side frame; and
    a side airbag that accommodates the inflator at an inner side thereof, and that is disposed within the outer-side side support portion in a folded-up state, and a folded-up one portion of the side airbag is disposed further toward a vehicle front side than the inflator that is disposed at the vehicle front side of the outer-side side frame, and a folded-up remaining portion of the side airbag is disposed further toward a vehicle rear side than the inflator, and the side airbag inflates and expands toward a vehicle front side of the outer-side side support portion due to pressure of gas jetted-out from the inflator, wherein:
    at the seatback, an inner-side side frame, that structures a portion of the seatback frame is disposed within an inner-side side support portion that is positioned at a vehicle transverse direction inner side,
    the outer-side side frame and the inner-side side frame are formed in open cross-sectional shapes whose seat transverse direction inner sides are open and whose vehicle rear sides project-out, further than vehicle front sides, toward seat transverse direction outer sides, and
    the remaining portion of the side airbag that is folded-up is disposed along a vehicle transverse direction outer side surface of the outer-side side frame.

12. The automobile seat in which a side airbag device is installed of claim 11, wherein a tubular retainer that is formed in a tube shape is mounted at the outer-side side frame, and the inflator is accommodated within the tubular retainer, and a surface at a vehicle rear side of the tubular retainer is provided as a reaction force receiving surface that receives a reaction force from the outer-side side frame at a time of inflation and expansion of the side airbag.

13. An automobile seat in which a side airbag device is installed, comprising:
    a seatback at which an outer-side side frame, that structures a portion of a seatback frame, is disposed within an outer-side side support portion that is positioned at a vehicle transverse direction outer side;

an inflator that is mounted to the outer-side side frame, and is disposed at a vehicle front side of the outer-side side frame; and a side airbag that accommodates the inflator at an inner side thereof, and that is disposed within the outer-side side support portion in a folded-up state, and a folded-up one portion of the side airbag is disposed further toward a vehicle front side than the inflator that is disposed at the vehicle front side of the outer-side side frame, and a folded-up remaining portion of the side airbag is disposed further toward a vehicle rear side than the inflator, and the side airbag inflates and expands toward a vehicle front side of the outer-side side support portion due to pressure of gas jetted-out from the inflator, wherein a tubular retainer that is formed in a tube shape is mounted at the outer-side side frame, and the inflator is accommodated within the tubular retainer, and a surface at a vehicle rear side of the tubular retainer is provided as a reaction force receiving surface that receives a reaction force from the outer-side side frame at a time of inflation and expansion of the side airbag.

14. The automobile seat in which a side airbag device is installed of claim 13, wherein the tubular retainer is formed to be rectangular in cross-section.

15. The automobile seat in which a side airbag device is installed of claim 13, wherein gas through-holes are formed in a vehicle front side and a vehicle transverse direction outer side at a lower portion of the tubular retainer, and gas jet-out ports that are provided at a lower portion of the inflator are disposed at a lower portion side of the tubular retainer.

* * * * *